United States Patent [19]
Davis

[11] 3,715,940
[45] Feb. 13, 1973

[54] MACHINE FOR CUTTING ROD-LIKE ARTICLES INTO REQUIRED LENGTHS

[75] Inventor: Lessel George Davis, Lurline Bay, New South Wales, Australia

[73] Assignee: Twentieth Century Blinds Pty. Limited, Undercliffe, New South Wales, Australia

[22] Filed: Dec. 7, 1970

[21] Appl. No.: 95,861

[30] Foreign Application Priority Data

Dec. 23, 1969 Australia............................65681/69

[52] U.S. Cl................................82/63, 82/101
[51] Int. Cl. ...............................................B23b 5/14
[58] Field of Search..........................82/59, 63, 101

[56] References Cited

UNITED STATES PATENTS

| | | | |
|---|---|---|---|
| 3,107,564 | 10/1963 | Coker et al................ | 82/59 |
| 3,159,071 | 12/1964 | Bateman.................... | 82/101 X |
| 2,326,293 | 8/1943 | Gast ........................... | 82/101 X |
| 1,214,575 | 2/1917 | Miller......................... | 82/101 X |

FOREIGN PATENTS OR APPLICATIONS

| | | | |
|---|---|---|---|
| 402,079 | 9/1924 | Germany.................... | 82/63 |
| 731,442 | 4/1966 | Canada ...................... | 82/63 |
| 100,560 | 4/1937 | Australia.................... | 82/59 |

*Primary Examiner*—Andrew R. Juhasz
*Assistant Examiner*—James F. Coan
*Attorney*—Stevens, Davis, Miller & Mosher

[57] ABSTRACT

A machine for cutting of the end of rod-like articles such as a rolled-up window shade. The article is held stationary and protrudes through a hole in the center of a flywheel, and a knife suspended from a lever pivoted on the flywheel cuts around the periphery of the article. A weight on the opposite end of the lever forces the knife against the flywheel by centrifugal action as the flywheel rotates.

5 Claims, 6 Drawing Figures

MACHINE FOR CUTTING ROD-LIKE ARTICLES INTO REQUIRED LENGTHS

The object of this invention is to provide a simple but effective machine for rapidly and neatly cutting rod-like articles to required length. It is primarily intended for use as a means for cutting an end portion from an over-long cylindrical article such as a rolled-up roller-blind, or the bare roller for such a blind. It could, however, be used for many other like purposes; for example, cutting cardboard mailing tubes to required length, cutting timber rods into short lengths for use as dowells, cutting washer-like element from a tubular rod, or simply squaring and finishing the ends of a rod-like article.

As already indicated, the invention has been devised primarily to enable rolled-up roller-blinds to be cut to required length so that the cut end will be squarely and smoothly finished, and the rolled-up shade, cut neatly around the roller; and the invention will be further described herein largely in terms of that particular purpose.

The invention provides:

A machine for cutting rod-like articles into required lengths, comprising:

a. a fly-wheel rotatably mounted on a machine base;
b. a cradle in which an article to be cut may be rested and held with its longitudinal axis substantially co-incident with that of the fly-wheel;
c. a first order lever eccentrically fulcrumed on the fly-wheel so that the lever may turn about its fulcrum in a plane normal to said fly-wheel axis;
d. a knife on one end of said lever;
e. a weight heavier than said knife on the other end of said lever; and
f. drive means for rotating said fly-wheel.

An example of the invention is illustrated in the drawings herewith:

Figure 1:
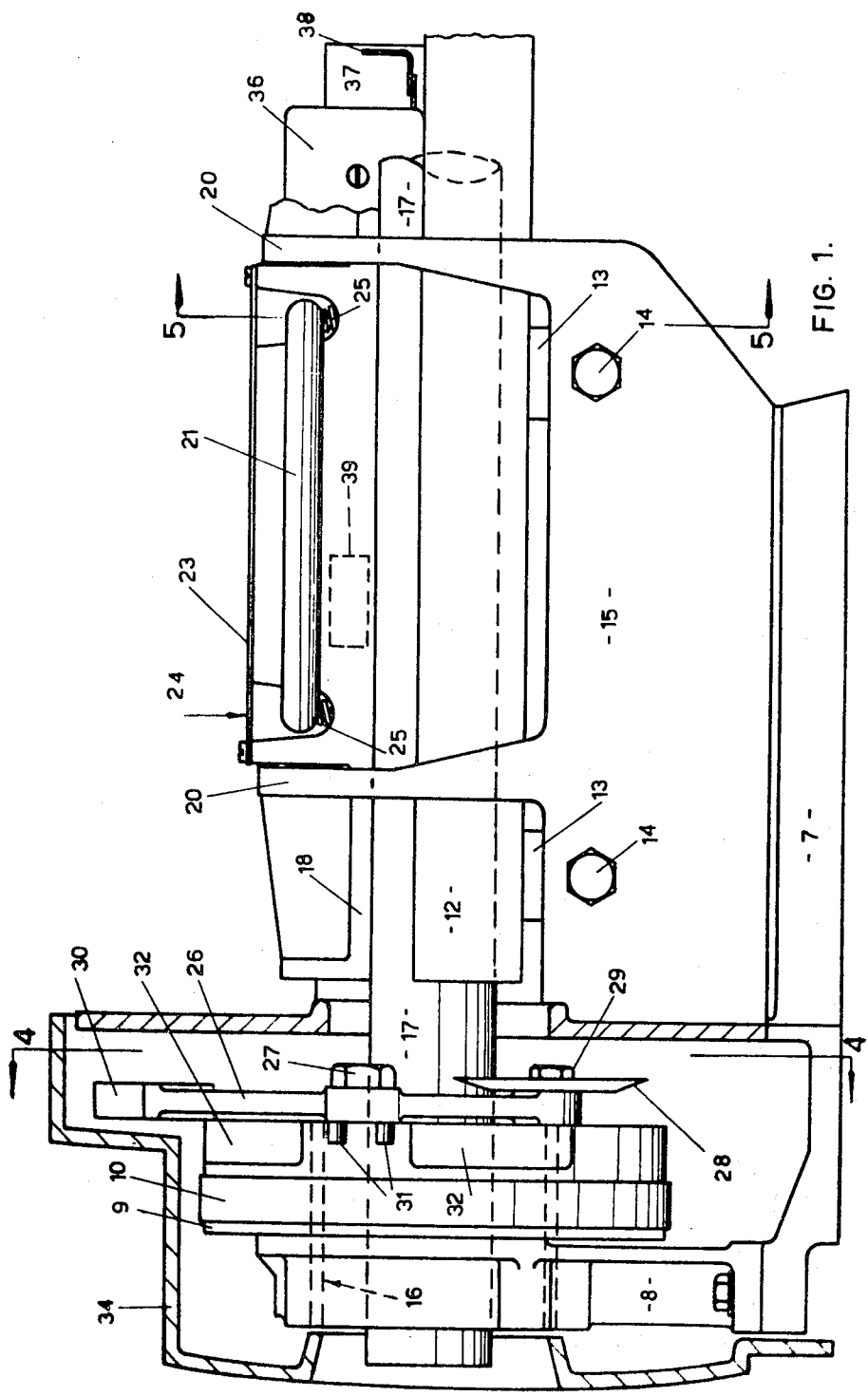
FIG. 1 is a side elevation of the cutting machine viewed from the front and shown partly in cross-section.
Figure 4:
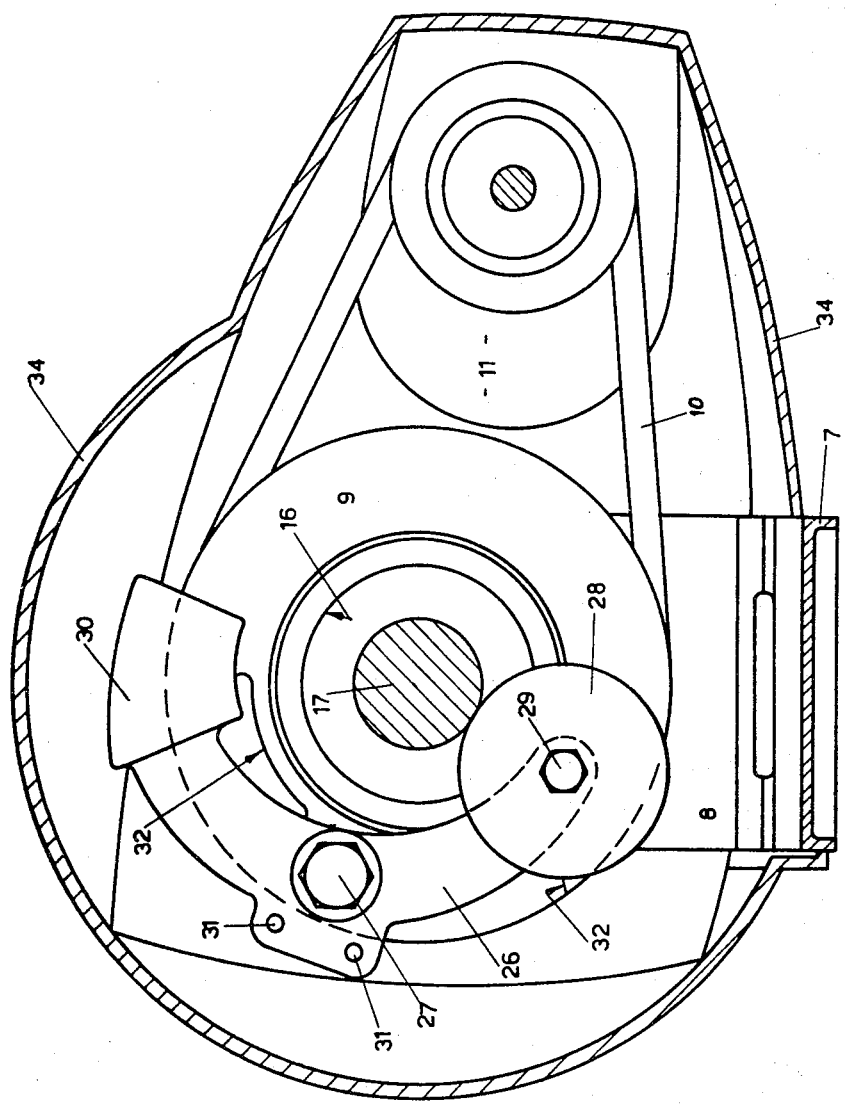
Figure 5:
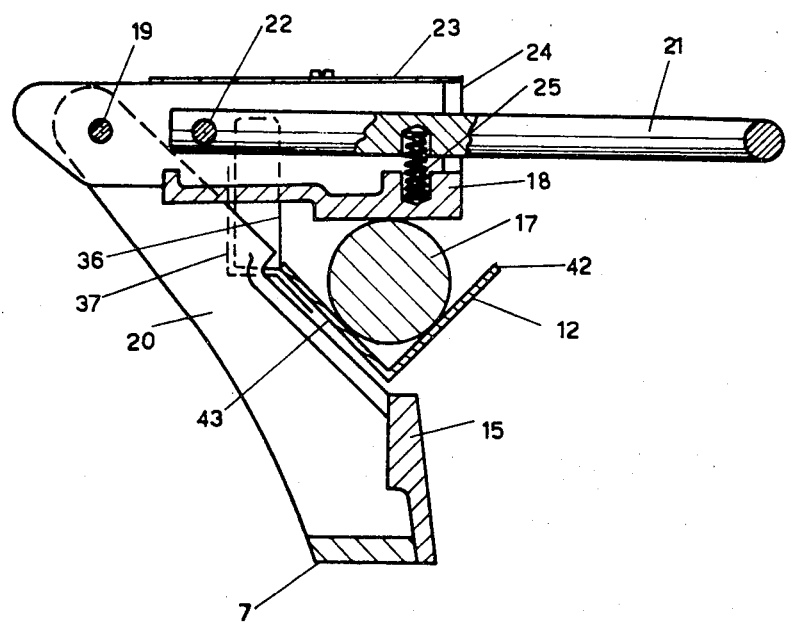

FIGS. 4 and 5 are sectional end elevations respectively taken on lines 4—4 and 5—5 in FIG. 1.

Figure 2:
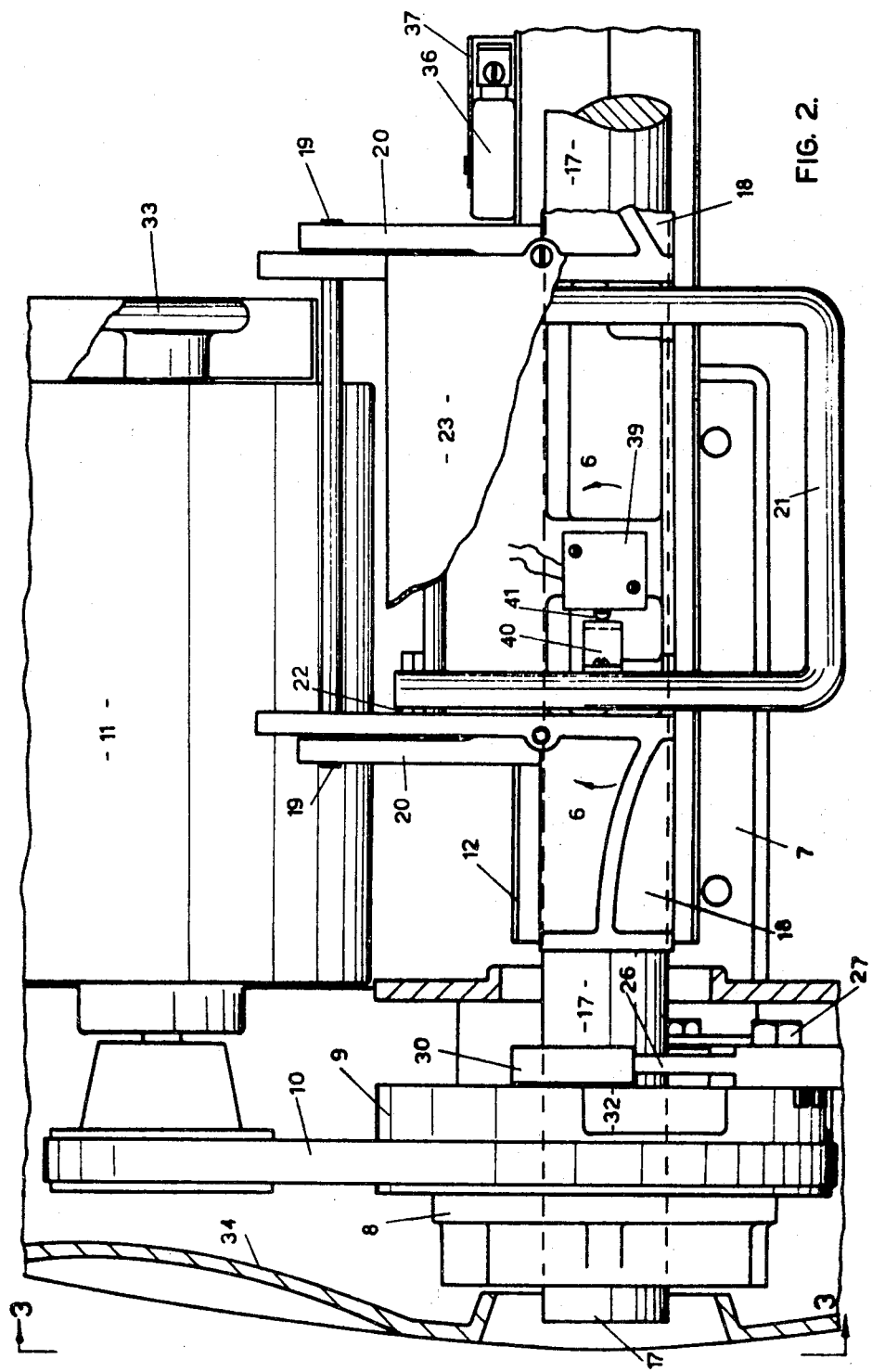
FIG. 2 is a plan projected from FIG. 1 also with parts in cross-section.
Figure 3:
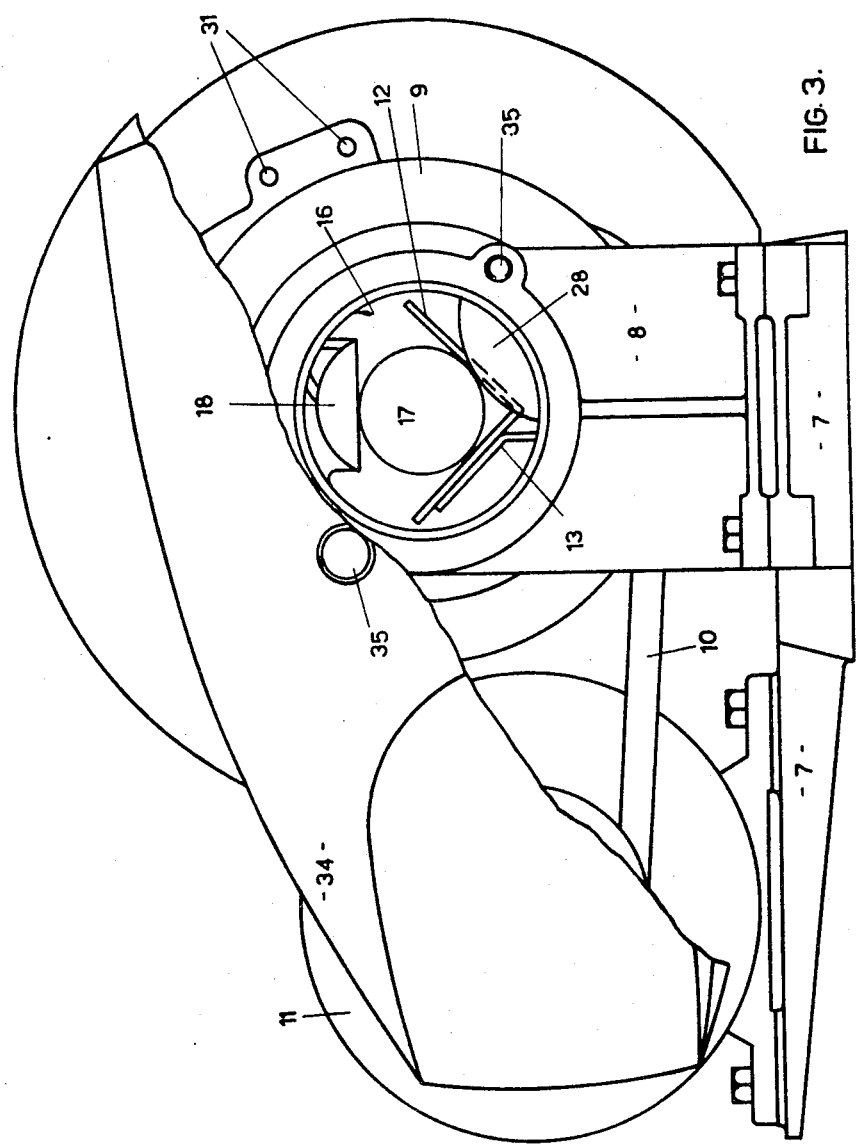
FIG. 3 is of end elevation of the machine, with part of a cover broken away, and viewed in the direction indicated by line 3—3 in FIG. 2.
Figure 6:
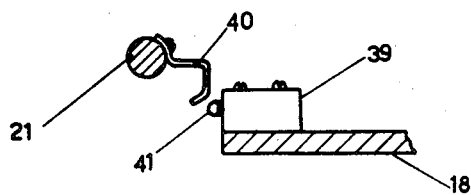

FIG. 6 is a sectional detail taken on line 6—6 in FIG. 2.

Referring to the drawings a machine base 7 carries a head-stock 8 which provides a bearing for a fly-wheel 9. The fly-wheel constitutes a pulley for a drive belt 10 from an electric motor indicated at 11. This motor is mounted on the machine base 7.

The work-holding cradle 12 is preferably in the form of a length of angle steel fixed on brackets 13 which in turn are fixed by bolts or set screws 14 to an upstanding flange like portion 15 forming part of the machine base. The head-stock 8 and the fly-wheel 9 preferably have center openings as indicated at 16. Where the piece to be cut from one end of the work 17 is relatively long the work-piece may extend right through the fly-wheel and the head-stock as shown in FIGS. 1 and 2.

The means whereby the work may be held in the cradle comprise a clamping plate 18 which is pivotally mounted at 19 on a pair of outriggers 20 fixedly joined to or forming part of the machine base 7.

An operating handle 21 is pivoted to the clamping plate at 22 and said clamping plate carries a cover 23 against the forward edge 24 of which (when the machine is not in use) handle 21 normally abuts under the influence of compression springs 25. When a piece of work is held in the cradle, handle 21 is depressed against the loading effect of springs 25 so to hold the work firmly in the cradle as shown in FIG. 5.

It will be seen that the location of the work cradle is such as to place the work with its longitudinal axis substantially coincident with that of fly-wheel 9. The axis of the work and that of the fly-wheel do not have to be exactly coincident, for example, with a fixed cradle the elevation of the work axis will vary with the diameter of the work but notwithstanding any such variation the machine will operate quite effectively as explained later herein. If desired the cradle brackets 13 may be furnished with elongated bolt holes for the mounting bolts 14 so that elevation of the cradle may be adjusted to bring the axes into precise or approximate coincidence.

A first-order lever 26 is fulcrumed eccentrically on the fly-wheel by way of fulcrum screw 27 and this lever at one end has a knife 28 mounted on it. This knife is preferably fixedly held on the lever by set screw 29 and it is preferably circular as shown so that when a part of it which encounters the work piece becomes worn, it may be partly turned and re-fixed in position so as to present a sharp portion of the knife to the work.

At its other end the lever carries a weight 30 which is heavier than knife 28 so that when the fly-wheel 9 is rotated the weight will move outwardly centrifugally so to bring the knife into cutting engagement with the work as it travels around the work due to the rotation of the fly-wheel.

Lever 26 preferably carries a pair of limit pegs 31 to set limits on the movement of the lever relative to the fly-wheel. The fly-wheel is preferably gapped as indicated at 32 so that when the fly-wheel and items mounted on it are rotating at a selected work speed the rotating assembly will be in (or approximately in) dynamic balance.

Where the driving means are constituted by an electric motor such as at 11 the motor shaft preferably carries a hand wheel 33 (FIG. 2) so that when the motor is inoperative the fly-wheel may be turned by hand into a position in which neither the knife 28 nor the weight 30 will obstruct entrance of a work piece into the center space 16.

It will be appreciated that this manual movement of the fly-wheel could be effected by hauling on belt 10, or rotating the fly-wheel 9 by hand, but a hand wheel such as 33 is preferably provided because of the virtual necessity for safety reasons in housing the knife and the rotating parts associated with it within a cover or casing as indicated at 34.

This cover or casing 34 may be held in position by screws 35 which thread into screwed holes provided in the head-stock 8. It will also be appreciated that the fly-wheel may be driven by any motor devices other than by way of an electric motor 11 or driving belt 10 as shown.

When a work piece is to be cut it is placed in the cradle and the required length may be measured by direct measurement from the blade 28 to the outer end of the work piece. The work piece is then held in position and the motor started so that the knife 28 will make the necessary cut. The work being firmly held in position by hand pressure on handle 21.

To facilitate measuring the required length of the work piece a self rolling tape measure of conventional kind may be provided. Such a tape measure is indicated at 36. It is securely mounted on bracket 37 fixed to the cradle 12. As stated the tape measure is of conventional kind and is provided with an end stop 38 which can be brought to bear (with slight twisting of the tape) against the outer end of the work (that is, the right hand end of the work as viewed in FIGS. 1 and 2).

The tape is of course suitably inscribed so that it takes into account that length of the work piece portion which extends between the tape measure and the knife 28.

Starting of motor 11 may be effected in any conventional manner, for example, by use of a hand pedal operated starter switch. For preference however the motor starter switch is in the form of a conventional micro-switch indicated at 39, this starter switch being fixedly mounted on the clamping plate 18. The handle 21 carries a striker bracket 40 or similar projection which, when the handle is lowered sweeps into contact with the operating button 41 of the switch so to start the motor, and when the handle 21 is allowed to rise under the influence of its springs 25 the bracket 40 sweeps clear of the switch button 41 so to open the motor circuit.

The arrangement just described for controlling operation of the motor is desirably employed because it provides a degree of safeguard against unintentional starting of the motor. In this connection it will be clear that in the absence of any pressure on handle 21 it will remain elevated in contact with the forward edge 24 of cover 23. Under these circumstances the striker 40 will remain clear of the switch button 41 and if the clamping plate 18 descends (as it will in the absence of any work piece in the cradle) the clamping plate will descend within the cradle while the handle 21 descends towards the cradle edge 42 (see FIG. 5). If under these circumstances the clamping plate remains clear of the cradle interior while the handle rests on the cradle edge 42 mutual approach of plate 18 and handle 21 is prevented so to prevent closure of switch 39. If the clamping plate descends into the cradle sufficiently to make contact with that side of it marked 43 in FIG. 5 the cradle edge 42 is then arranged to be sufficiently elevated so that even in the event of downward pressure being then applied to handle 21, edge 42 will obstruct it from approaching the clamping plate with sufficient closeness for closure of switch 39.

I claim:

1. A machine for cutting rod-like articles into required lengths, comprising:
   a. a fly-wheel rotatably mounted on a machine base;
   b. a cradle of angular cross-sectional shape, in which an article to be cut may be rested, mounted on the machine base by means enabling elevational adjustment of the cradle to bring and hold the longitudinal axis of said article into substantial co-incidence with that of the fly-wheel;
   c. a first order lever eccentrically fulcrumed on the fly-wheel so that the lever may turn about its fulcrum in a plane normal to said fly-wheel axis;
   d. a knife on one end of said lever;
   e. a weight heavier than said knife on the other end of said lever; and
   f. drive means for rotating said fly-wheel.

2. A machine for cutting rod-like articles into required lengths, comprising:
   a. a fly-wheel rotatably mounted on a machine base;
   b. a cradle in which an article to be cut may be rested and held with its longitudinal axis substantially coincident with that of the fly-wheel;
   c. a first order lever eccentrically fulcrumed on the fly-wheel so that the lever may turn about its fulcrum in a plane normal to said fly-wheel axis;
   d. a knife on one end of said lever;
   e. a weight heavier than said knife on the other end of said lever;
   f. drive means for rotating said fly-wheel; and
   g. a clamping plate pivotally mounted on the machine base and able to rest upon an article work-piece in said cradle, a handle pivoted on said clamping plate and spring means which resiliently oppose mutual approach of said clamping plate and said handle.

3. A machine for cutting rod-like articles into required lengths, comprising:
   a. a fly-wheel rotatably mounted on a machine base;
   b. a cradle of angular cross-sectional shape, in which an article to be cut may be rested, mounted on the machine base by means enabling elevational adjustment of the cradle to bring and hold the longitudinal axis of said article into substantial co-incidence with that of the fly-wheel;
   c. a first order lever eccentrically fulcrumed on the fly-wheel so that the lever may turn about its fulcrum in a plane normal to said fly-wheel axis;
   d. a knife on one end of said lever;
   e. a weight heavier than said knife on the other end of said lever;
   f. a clamping plate pivotally mounted on the machine base and able to rest upon an article work-piece in said cradle, a handle pivoted on said clamping plate and spring means which resiliently oppose mutual approach of said clamping plate and said handle; and
   g. an electric motor for rotating said fly-wheel furnished with a starter switch mounted on said clamping plate, and a striker for said switch mounted on said handle.

4. A machine according to claim 1 in which said knife is in the form of a disc.

5. A machine according to claim 2 wherein the drive means for rotating said fly-wheel is an electric motor furnished with a starter switch mounted on said clamping plate, and a striker for said switch mounted on said handle.

* * * * *